US010126938B2

(12) United States Patent
Min et al.

(10) Patent No.: US 10,126,938 B2
(45) Date of Patent: Nov. 13, 2018

(54) TOUCH INPUT APPARATUS AND VEHICLE HAVING THE SAME

(71) Applicant: HYUNDAI MOTOR COMPANY, Seoul (KR)

(72) Inventors: Jungsang Min, Seoul (KR); Gi Beom Hong, Bucheon-si (KR); Jeong-Eom Lee, Yongin-si (KR); Sihyun Joo, Seoul (KR)

(73) Assignee: Hyundai Motor Company, Seoul (KR)

( * ) Notice: Subject to any disclaimer, the term of this patent is extended or adjusted under 35 U.S.C. 154(b) by 42 days.

(21) Appl. No.: 15/132,523

(22) Filed: Apr. 19, 2016

(65) Prior Publication Data

US 2016/0320960 A1 Nov. 3, 2016

(30) Foreign Application Priority Data

Apr. 30, 2015 (KR) .......................... 10-2015-0061386

(51) Int. Cl.
*G06F 3/041* (2006.01)
*G06F 3/0488* (2013.01)
*B60K 37/06* (2006.01)
*G06F 3/0338* (2013.01)
*G06F 3/0354* (2013.01)

(52) U.S. Cl.
CPC .......... *G06F 3/04883* (2013.01); *B60K 37/06* (2013.01); *G06F 3/0338* (2013.01); *G06F 3/03547* (2013.01); *B60K 2350/1028* (2013.01)

(58) Field of Classification Search
CPC ............ B60K 2350/1028; B60K 37/06; G06F 3/0338; G06F 3/03547; G06F 3/04883
See application file for complete search history.

(56) References Cited

U.S. PATENT DOCUMENTS

| 2007/0057922 | A1 | 3/2007 | Schultz et al. | |
| 2010/0315349 | A1* | 12/2010 | Choi | G06F 3/0338 345/173 |
| 2011/0232412 | A1* | 9/2011 | Hashimoto | B60Q 1/1484 74/491 |
| 2013/0015964 | A1* | 1/2013 | Muller | H01H 25/06 340/459 |

FOREIGN PATENT DOCUMENTS

| JP | 2012-176631 A | 9/2012 |
| JP | 2014-002996 A | 1/2014 |
| JP | 2015-033974 A | 2/2015 |
| KR | 10-2005-0003393 A | 1/2005 |
| KR | 10-2007-0114143 A | 11/2007 |
| KR | 10-2009-0084767 A | 8/2009 |
| KR | 10-2014-0138361 A | 12/2014 |

OTHER PUBLICATIONS

Korean Office Action issued in Application No. 10-2015-0061386 dated May 30, 2016.

* cited by examiner

*Primary Examiner* — Insa Sadio
(74) *Attorney, Agent, or Firm* — McDermott Will & Emery LLP

(57) ABSTRACT

A touch input apparatus mounted on a mounting surface includes a protrusion protruding from the mounting surface. A recessed portion is formed in the protrusion. A touch portion is provided on a bottom surface of the recessed portion and receives a user's touch signal. A vehicle having the touch input apparatus includes a display and a controller configured to operate the display according to the users input inputted to the touch input apparatus.

20 Claims, 21 Drawing Sheets

TOUCH INPUT APPARATUS AND VEHICLE HAVING THE SAME

CROSS-REFERENCE TO RELATED APPLICATION

This application claims the benefit of priority to Korean Patent Application No. 10-2015-0061386, filed on Apr. 30, 2015 in the Korean Intellectual Property Office, the disclosure of which is incorporated herein by reference.

TECHNICAL FIELD

The present invention relates to a touch input apparatus and a vehicle having the same, and more particularly, to a touch input apparatus through which a user may input a touch signal, and a vehicle including the same.

BACKGROUND

In general, a variety of electronic devices are made through development of an electronic communication technology, and user convenience and aesthetic appearance have been emphasized to the electronic devices. This trend emphasizes diversification of input apparatuses such as a keyboard or a keypad.

An input apparatus is used for various kinds of display systems such as a portable terminal, a notebook, a smart phone, a smart pad, and a smart TV, which provide various information to a user. Recently, as electronic devices have been developed, an input method of a touch as a command signal has been used in addition to using an operation key, a dial, or the like.

A touch input apparatus may be one of input apparatuses included in interfaces between data communication devices which use various displays and users, and may interface between the electronic devices and users by directly touching or coming close to a touch pad or a touch screen using a user's finger or an input tool such as a touch pen.

Since the users of all ages may easily use the touch input apparatus only by touching the input tool such as the finger or the touch pen, the touch input apparatus is used for various devices such as an automated teller machine (ATM), a personal digital assistant (PDA), and a mobile phone, and is also variously used for many fields such as a bank, a public office, and tourist and traffic information.

Recently, an effort for applying the touch input apparatus to health or medical care related products and a vehicle has been continued. Particularly, since a touch panel is used with a touch screen or is independently used for a display system, applicability thereof has been increased. In addition, recently, a function of inputting a gesture has been developed in addition to a function of moving a point in a screen using a touch. In a case of a touch input apparatus capable of inputting a gesture, an effort of increasing a recognition rate of gesture has been continued.

For example, an operation member for a multimedia system of a vehicle is disclosed in a related art. The disclosed technology includes a touch pad and a handle or a dial pivotably provided with respect to the touch pad.

However, when a dial is included, there is a problem in that a structure of the operation member becomes complex and it is difficult to focus on aesthetic effect.

SUMMARY

An aspect of the present disclosure provides a touch input apparatus capable of inputting a touch signal corresponding to user's intention in a state in which user's sight is not distracted, and decreasing an error rate thereof and a vehicle including the same.

Another aspect of the present disclosure provides a touch input apparatus capable of improving an operational sensation or a touch sensation when a user inputs a touch gesture.

Still another aspect of the present disclosure provides a touch input apparatus capable of completing an elegant and unified design by removing a dial and simplifying a structure of the touch input apparatus.

Additional aspects will be set forth in part in the description which follows and, in part, will be obvious from the description, or may be learned by practice of the invention.

In accordance with one embodiment in the present disclosure, a touch input apparatus mounted on a mounting surface includes: a protrusion protruding from the mounting surface; a recessed portion formed in the protrusion, and a touch portion provided on a bottom surface of the recessed portion and receiving a user's touch signal.

The protrusion may be integrally formed with the mounting surface.

The protrusion may include a cross-section having a circular shape, and the recessed portion may be recessed in a circular shape from a ridge portion of the protrusion.

The recessed portion may include an inner side surface recessed from the protrusion, a bottom portion on which the touch portion is provided, and a connecting portion which connects the inner side surface and the bottom portion and which has an inclined surface or a curved surface having a negative curvature.

An upper portion, a lower portion, a left portion, a right portion, and a central portion of the touch portion may receive different touch signals.

The touch portion may include a recessed curved shape.

The recessed portion may include an inner side surface recessed from the protrusion, a bottom portion on which the touch portion is provided, and a connecting portion which connects the inner side surface and the bottom portion and which has an inclined surface or a curved surface having a negative curvature. The connecting portion may receive a rolling gesture.

The recessed portion may include an inner side surface recessed from the protrusion, and a bottom portion on which the touch portion is provided. The bottom portion may independently move with respect to the inner side surface.

The bottom portion may tilt in upper, lower, left, and right directions.

The recessed portion further may include a connecting portion which connects the inner side surface and the bottom portion and which has an inclined surface or a curved surface having a negative curvature. The connecting portion may receive a rolling gesture.

The connecting portion may receive a rolling gesture.

The connecting portion may include a plurality of graduations formed in an embossed or intaglio manner.

The touch portion may include a central touch portion positioned in a center thereof, and a peripheral touch portion which surrounds the central touch portion. The central touch portion and the peripheral touch portion may independently receive a touch signal.

The central touch portion may include a recessed curved shape.

The bottom portion may include a first bottom portion on which the central touch portion is provided, and a second bottom portion on which the peripheral touch portion is provided. The first bottom portion and the second bottom portion may be provided to be relatively movable to each other.

The first bottom portion may tilt.

The protrusion, the recessed portion, and the touch portion may be formed into one structure. The structure may tilt with respect to the mounting surface.

The touch input apparatus may further include a body including the protrusion, the recessed portion, and the touch portion.

In accordance with another embodiment in the present disclosure, a touch input apparatus mounted on a mounting surface includes; a protrusion mounted to protrude from the mounting surface in a cylinder shape; a recessed portion having a central portion of the protrusion to be recessed and including an inner side surface connected downward from a ridge portion of the protrusion and a bottom portion connected to the inner side surface; and a touch portion provided on a bottom portion of the recessed portion and configured to receive a user's touch signal.

In accordance with still another embodiment in the present disclosure, a vehicle includes: a touch input apparatus, which is mounted on a mounting surface includes: a protrusion protruding from the mounting surface; a recessed portion formed in the protrusion, and a touch portion provided on a bottom surface of the recessed portion and receiving a user's touch signal; a display; and a controller configured to operate the display according to a user's touch input which is inputted to the touch input apparatus.

The controller may convert the user's input to the touch input apparatus into an input signal, and send an operational signal so that the display displays an operation according to the input signal. The user's input includes a gesture input.

BRIEF DESCRIPTION OF THE DRAWINGS

These and/or other aspects will become apparent and more readily appreciated from the following description of the embodiments, taken in conjunction with the accompanying drawings.

FIG. 4 is a plan view of push input, FIG. 5 is a plan view of swiping input, and FIG. 6 is a plan view of character input.

DETAILED DESCRIPTION

Figure 1:
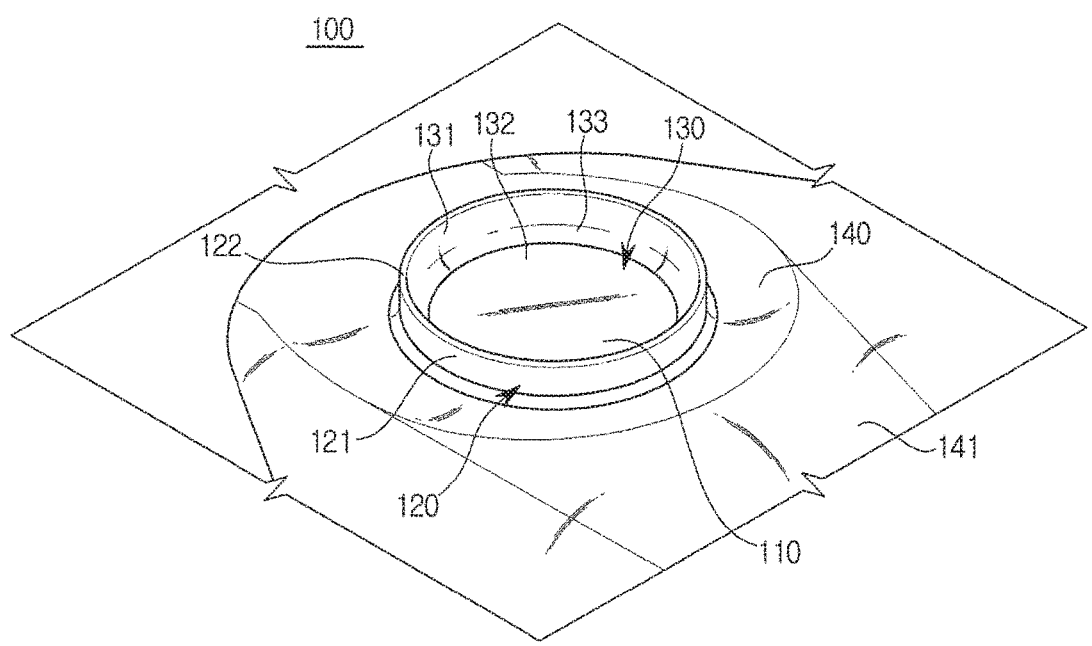
FIG. 1 is a perspective view illustrating a touch input apparatus according to a first embodiment in the present disclosure.

Hereinafter, embodiments in the present disclosure will be described in detail with reference to following drawings. The following drawings are examples to provide the scope of the present disclosure to those skilled in the art. The present disclosure is not limited to the following embodiments and may be implemented in different forms. Parts irrelevant to description are omitted in the drawings in order to clearly describe the present invention, and sizes of components in the drawings may be exaggerated for convenience of description.

A touch input apparatus according to a first embodiment in the present disclosure will be described with reference to FIGS. 1 to 3.

Figure 2:
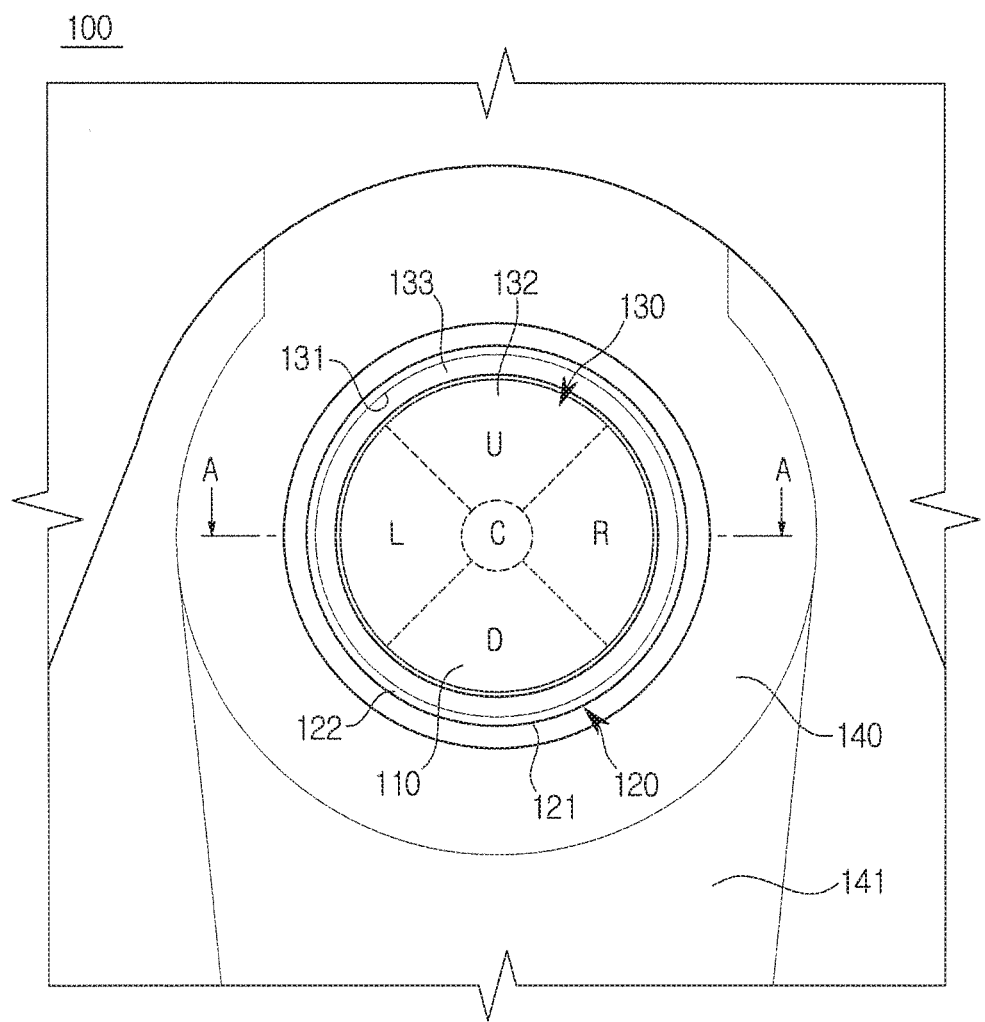
FIG. 2 is a plan view illustrating the touch input apparatus according to the first embodiment in the present disclosure.
Figure 3:
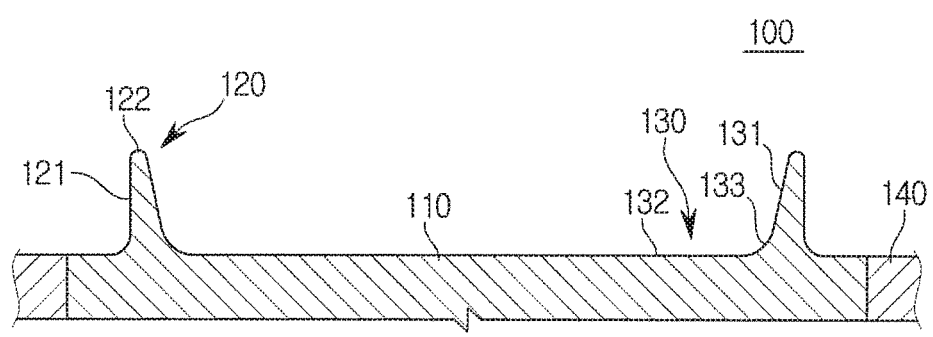
FIG. 3 is a cross-sectional view taken along line A-A of FIG. 2.

FIG. 1 is a perspective view illustrating a touch input apparatus according to a first embodiment in the present disclosure, FIG. 2 is a plan view illustrating the touch input apparatus according to the first embodiment, and FIG. 3 is a cross-sectional view taken along line A-A of FIG. 2.

A touch input apparatus 100 according to the first embodiment in the present disclosure is mounted on a mounting surface 140, and includes a protrusion 120 which protrudes from the mounting surface 140, a recessed portion 130 formed to be inwardly recessed from the protrusion 120, and a touch portion 110 provided on a bottom surface of the recessed portion 130. The protrusion 120, the recessed portion 130, and the touch portion 110 may be integrally formed or may be coupled to form one structure.

The mounting surface 140 may be formed to surround a vicinity of the touch input apparatus 100, and may be separated from the touch input apparatus 100. The mounting surface 140 may have a flat shape as a reference surface on which the touch input apparatus 100 is mounted. However, it is not limited thereto, and the mounting surface 140 may include a convex surface or a concave surface.

Although it is not illustrated in the drawings, an input tool such as a key button or a touch button which surrounds the touch input apparatus 100 may be positioned on the mounting surface 140. A user may also input a touch signal using the touch input apparatus 100, or may input a signal using a button provided on the mounting surface 140 around the touch input apparatus 100.

The protrusion 120 protrudes from the mounting surface 140. A horizontal cross-section of the protrusion 120 may have a circular shape. As one example, the protrusion 120 may have a cylindrical shape or a column shape. However, a shape of the protrusion 120 may be variously changed based on a necessity.

The protrusion 120 include an outer surface 121 connected to the mounting surface 140, and a ridge portion 122 connected to the outer surface 121. As one example, the outer surface 121 having a cylindrical shape and the ridge portion 122 having a ring shape are illustrated in the figures.

The recessed portion 130 is inwardly recessed from the ridge portion 122 of the protrusion 120. The recessed portion 130 may include an opening whose horizontal cross-section is a circular shape. As one example, the recessed portion 130 may have a one side opened circular shape and inwardly recessed from the ridge portion 122 of the protrusion 120.

The recessed portion 130 may include an inner side surface 131 connected to the ridge portion 122, and a bottom portion 132 on which the touch portion 110 is provided. For example, the inner side surface 131 has a cylinder shape and the bottom portion 132 has a circular flat shape.

In addition, the recessed portion 130 may include a connecting portion 133 which connects the inner side surface 131 and the bottom portion 132. As one example, the connecting portion 133 may have an inclined surface or a curved surface having a negative curvature. Here, the negative curvature is a curvature formed to be recessed when seen from the outside of the recessed portion 130.

The bottom portion 132 may include the touch portion 110. The touch portion 110 may receive a touch input signal of a user.

The touch portion 110 may include a touch pad through which a signal is input when the user touches or comes close to the touch pad using a pointer such as a finger or a touch pen. The user may input a certain touch gesture to the touch portion 110 and input a desired instruction or command.

The touch pad, despite the name, may include a touch film or a touch sheet including a touch sensor. In addition, the touch pad may include a touch panel which is a display apparatus whose screen is touchable.

Recognizing of a position of a pointer when the pointer does not touch the touch pad and comes close thereto is named a "proximity touch", and recognizing of a position of a pointer when the pointer touches the touch pad is named a "contact touch". At this time, the position on which the proximity touch is performed may be a position on which the pointer vertically corresponds to a touch pad when the pointer comes close to the touch pad.

The touch pad may use a resistance method, an optical method, a capacitance method, an ultrasonic method, a pressure method, or the like. That is, the touch pad having various known methods may be used.

The mounting surface 140 may further include a wrist support portion 141 positioned beneath a gesture input tool and configured to support his or her wrist. The wrist support portion 141 may be positioned higher than the touch portion 110. Accordingly, when the user inputs a gesture to the touch portion 110 using his or her finger in a state in which the wrist support portion 141 supports his or her wrist, the wrist may be prevented from being bent upward. Accordingly, the user's musculoskeletal disease is prevented and further convenient operational sensation may be provided.

The touch input apparatus 100 may include a controller (not shown) which recognizes a touch input signal which is input to the touch portion 110, analyzes the touch input signal, and sends a command to various devices.

The touch input signal may include a tap signal generated when a pointer touches a certain position of the touch portion 110, and a gesture signal is generated when the pointer moves while touching the touch portion 110.

When the pointer touches a divided area of the touch portion 110, the controller recognizes the touch as a tap signal, and performs a predetermined command according to the divided area.

Referring to FIG. 2, the touch portion 110 may be divided into a central portion and a peripheral portion. As one example, when the touch portion 110 has a circular shape, the central portion of the touch portion 110 have a small circle portion positioned therein, and the peripheral portion may have a large circle portion except the central portion. An area of the touch portion 110 may be divided further as necessary.

In addition, the peripheral portion of the touch portion 110 may be divided into an upper portion, a lower portion, a left portion, and a right portion. As one example, the area of the touch portion 110 may be divided by 90° or may be divided by a smaller angle than 90°.

Referring to FIG. 2, the circular touch portion 110 may include a central portion C in the small circle portion therein, and peripheral portions U, D, L, and R, and the peripheral portions U, D, L, and R may be quadrisected along a circumference thereof by 90°. As one example, when a pointer taps the central portion C, the controller may perform a command to select a menu on which a cursor is positioned, and when the pointer taps a upper portion U, a lower portion D, a left portion L, and a right portion R of the peripheral portion, the controller may perform a command which moves a cursor in upper, lower, left, and right directions.

The divided touch areas of the touch portion 110 may be indicated visually. As one example, the peripheral portions U, D, L, and R of the touch portion 110 may be indicated using arrows, and the central portion C and the peripheral portions U, D, L, and R of the touch portion 110 may be indicated using different colors. Alternatively, a light emitting diode (LED) light may be installed in one of the central portion C and the peripheral portions U, D, L, and R of the touch portion 110 to shine.

Alternatively, the divided touch areas of the touch portion 110 may not be indicated visually. In this case, when a user touches a central portion of the touch portion 110, it may be recognized that the central portion C is touched, and when the user touches the upper area of the touch portion 110, it may be recognized that the upper portion U of the peripheral portion is touched.

Alternatively, the divided touch areas of the touch portion 110 may be indicated with different touch sensations. The central portion C and the peripheral portions U, D, L, and R of the touch portion 110 may be divided by having surfaces to have different roughness, temperature, or the like.

When the pointer moves while touching the touch portion 110, the controller may recognize the movement as a gesture signal, trace the movement of the pointer, find a gesture shape, and preform a predetermined command according to the gesture shape.

As one example, the controller may move a cursor or a menu on the display according to trace of the pointer which moves on the touch portion 110. That is, when the pointer moves from an upper portion to a lower portion, a cursor shown in the display may move in the same direction, or a menu selected in advance may be moved from an upper menu to a lower menu.

In addition, the controller may analyze a trace of the pointer, corresponding to a trace to a certain gesture, and perform a command according to the corresponding gesture. When the gesture of the pointer performs flicking or swiping, rolling, circling or spinning, or tapping, the controller may recognize the gesture and perform a corresponding command. Alternatively, the user may input a gesture using various touch input methods.

Here, the flicking or swiping is a touch input method that after the pointer moves in one direction while touching the touch portion 110, the pointer releases the touch state, the rolling is a touch input method that draws a circular arc around the touch portion 110, the circling or spin is a method that draws a circle around the touch portion 110, and the tapping is a touch input method that taps the touch portion 110. The tap method may include a multi tap method which continuously taps.

The user may also input a gesture using a multi pointer input method. The multi pointer input method is a method which inputs a gesture in a state in which two pointers simultaneously or sequentially touches the touch portion 110. As one example, in a state in which two fingers touch the touch portion 110, a gesture may be input. The user may send various commands by inputting a gesture using the single pointer input method and/or the multi pointer input method.

In addition, the user may also input a gesture by drawing a character, numeral, or predetermined symbol. As one example, consonants and vowels of Korean alphabet, alphabets, Arabic numerals, symbols for four fundamental arithmetic operations, or the like may be drawn. As the user inputs desired characters or numerals directly, input time decreases and a further intuitive interface may be provided.

The touch portion 110 provided on the bottom portion 132 has been described above. However, the touch portion 110 may be provided at various positions of the protrusion 120 and the recessed portion 130. As an installation position of the touch portion 110 is varied, the user may input various commands.

The protrusion 120 may be provided for a touch input. As one example, the user may input a touch signal through an operation of gripping and turning the outer surface 121 of the protrusion 120. Here, since the protrusion 120 is fixed to the mounting surface 140, the protrusion 120 does not rotate physically; however, the controller may recognize that the user's hand (one example of the pointer) slips while touching the outer surface 121.

Providing the outer surface 121 of the protrusion 120 to be capable of touch input may correspond to dial input. A dial may be installed at a knob or the like, may be physically rotatable, and may adjust a volume according to the degree of rotation. In the present disclosure, when the outer surface 121 of the protrusion 120 is provided for the touch input, the gripping and turning the outer surface 121 may obtain the same effect as an operation of the dial.

The ridge portion 122 of the protrusion 120 may be provided for a touch input. In this case, the user may input a rolling gesture by drawing a circle along the ridge portion 122 while touching the ridge portion 122. Alternatively, the inner side surface 131 or the connecting portion 133 of the recessed portion 130 may be provided for a touch input.

Figure 4:
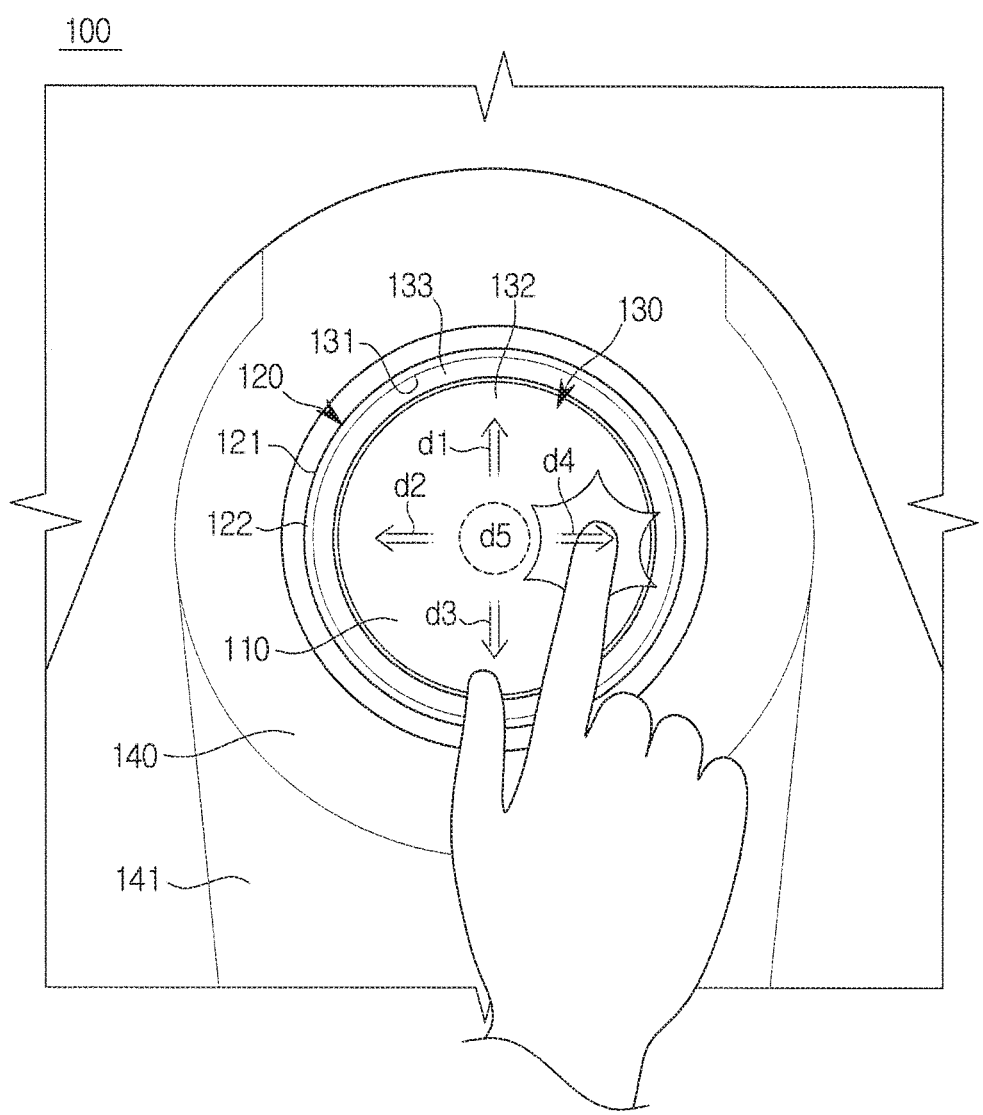
FIGS. 4 to 6 are views when the touch input apparatus according to the first embodiment in the present invention is operated.
Figure 5:
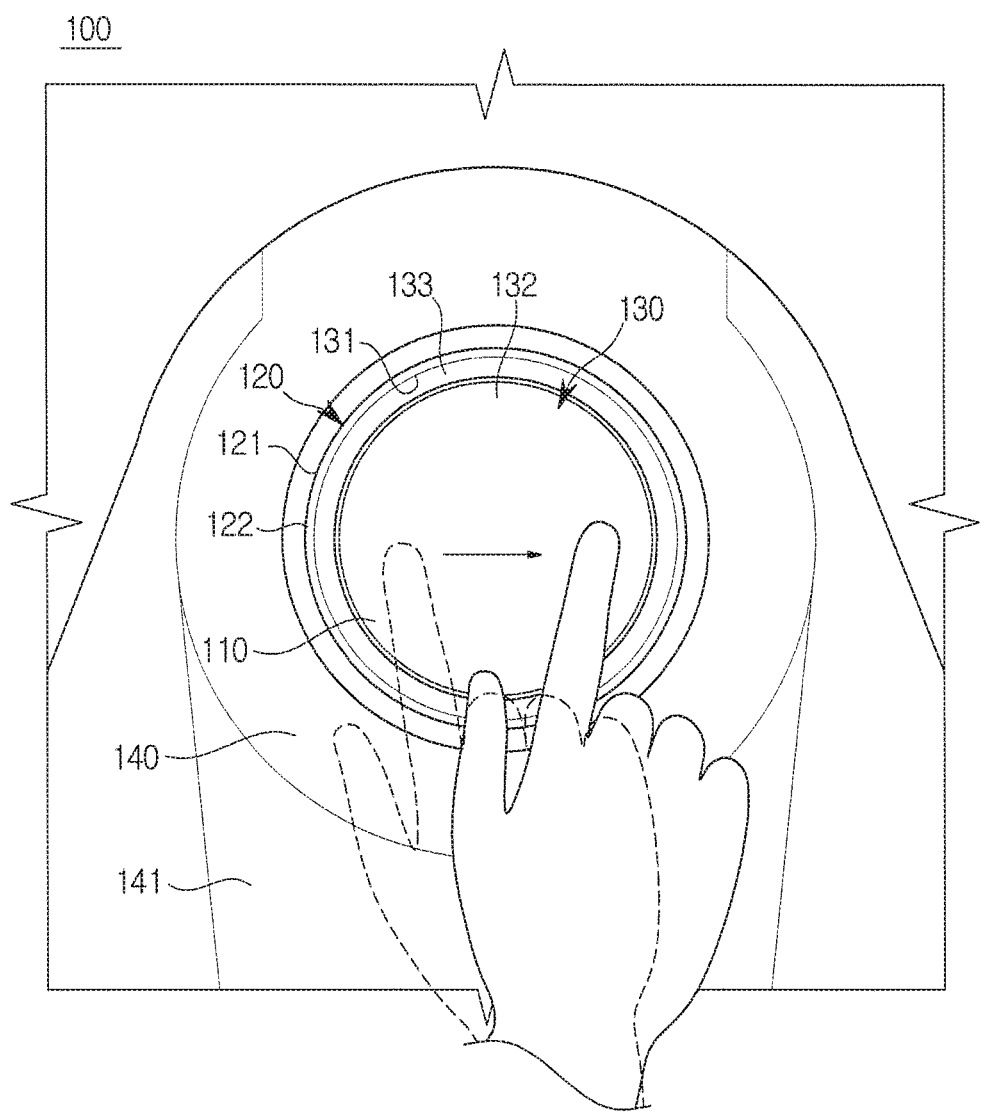
Figure 6:
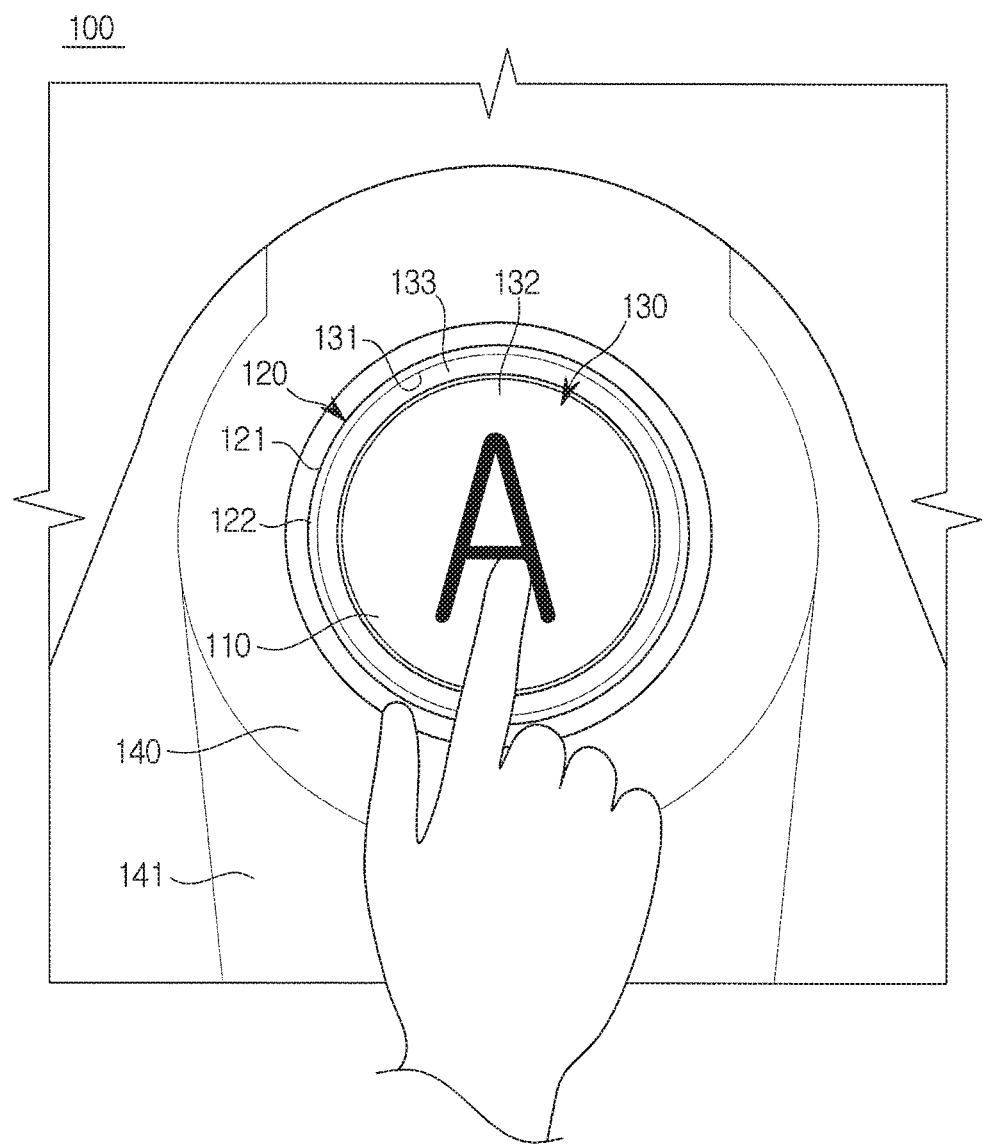

FIGS. 4 to 6 are views when the touch input apparatus 100 according to the first embodiment is operated, FIG. 4 is a plan view of push input, FIG. 5 is a plan view of swiping input, and FIG. 6 is a plan view of character input.

The above description describes that the user may input a certain action signal by performing a tap operation which taps one area of the touch portion 110. In addition, the touch portion 110 may be provided for a push operation or an inclination operation. In addition, when the touch portion 110 is flexibly provided, only a position which is pressed may also be pushed.

The touch portion 110 may be inclined in at least one direction d1 to d4 with respect to a central axis. Referring to FIG. 4, the touch portion 110 may be inclined in front, rear, left, and right directions d1 to d4. In addition, the touch portion 110 may to be inclined in other various directions. In addition, when a central portion d5 of the touch portion 110 is pressed, the touch portion 110 may be pressed in a parallel state.

The bottom portion 132, in which the touch portion 110 is provided, may independently move with respect to the inner side surface 131. The bottom portion 132 may be provided for a push operation, or may also be provided for an inclination or tilting operation. As one example, when a user presses the touch portion 110, a pressed area of the bottom portion 132 may be pushed, or the bottom portion 132 may be inclined in a direction toward which a pressure is applied.

The user may input a certain action signal by applying a pressure to push or incline a part of the touch portion 110. As one example, the user may push the central portion d5 of the touch portion 110 to perform a selected menu and the like, and the user may push the upper portion d1 of the touch portion 110 to move a cursor to the upper portion.

A push structure of the touch portion 110 may include a button (not shown) installed under the touch portion 110. The button may have a clickable structure. That is, the user may touch the touch portion 110 to input a touch signal, and simultaneously, the user may also push the touch portion 110 to input a click signal.

One button may be provided under the touch portion 110. In this case, the user may click a center of the touch portion 110 to input a click signal, and the user may tap center, upper, lower, a left, and right portions of the touch portion 110 to input a touch signal.

Alternatively, a plurality of buttons may be provided under the touch portion 110. As one example, total five buttons may be installed at a center, an upper, a lower, a left, or and a right portions thereof. In this case, the user may click the center, the upper, the lower, the left, and the right portions of the touch portion 110 to input different click signals, or the user may also tap the center, the upper, the lower, the left, and the right portions of the touch portion 110 to input touch signals.

Even though it is not illustrated in the drawings, the touch input apparatus 100 may embed various components related to operation. In the touch portion 110, a structure configured to be pushable or inclinable in the above-described five directions d1 to d5 may be included in the touch input apparatus 100. However, since such structures are implemented using known technologies, the detailed description thereof will be omitted.

In addition, various semiconductor chips, printed circuit boards, and the like may be installed in the touch input apparatus 100. A semiconductor chip may be mounted on a printed circuit board, and may perform an information processing or store data. The semiconductor chip may interpret a predetermined electric signal generated according to an external force applied on the touch input apparatus 100, a gesture recognized by the touch portion 110, or an operation of the button provided in the touch input apparatus 100, may generate a predetermined control signal according to the interpreted content, and may transfer the predetermined control signal to a controller or a display of other apparatuses.

Referring to FIG. 5, the user may perform a flicking or swiping operation which scrubs the area of the touch portion 110 to input a certain action signal. As one example, the user may scrub a right side of the touch portion 110 while touching a left side thereof to move a menu shown in the display to a next menu.

Referring to FIG. 6, the user may draw numerals, characters, or gestures on the touch portion 110 to input a predetermined action signal. As one example, the user may input alphabet "A" in the touch portion 110 to input "A" in an input column of the display. The user may directly input a character in the touch portion 110 to more easily and quickly input the desired character than the user selects the corresponding character out of a character table listed in the display.

A recognition rate of a gesture may increase when the gesture is input at the central portion of the touch portion 110. In addition, when a similar gesture is input from a different position, there is a risk that the gesture is recognized as a different command. The problem occurs when the user inputs the gesture without keeping his or her eyes on a touch area. When the user inputs a gesture while seeing the front or the display, or concentrating on an external state, and intuitively recognizes a touch area and a border thereof using a touch sensation, it is advantageous for the user to input the gesture to a correct area. Accordingly, the accuracy of gesture input may be improved and the convenience of the user may be improved.

In the touch input apparatus 100 according to the first embodiment, as the protrusion 120 which protrudes from the mounting surface 140 is provided at an outside of the touch portion 110, the user may recognize the area and the border of the touch portion 110 by a sense of touch rather than a sense of sight. The user may easily recognize the protrusion 120 by groping with the hand, and since the ridge portion 122 of the protrusion 120 forms a closed curve (as one example, a circular shape), the user may intuitively recognize a central position of the touch portion 110. Accordingly, the user may recognize a position of the central portion thereof correctly by recognizing both sides of the protrusion 120 even while keeping eyes on a different side.

Figure 7:
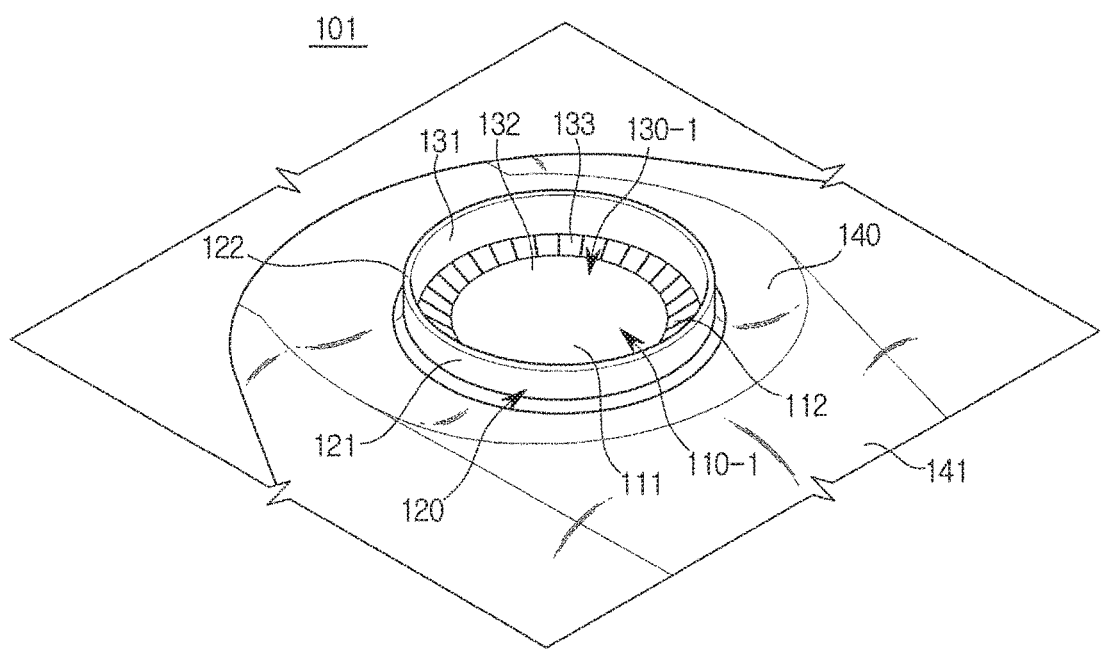
FIG. 7 is a perspective view illustrating a touch input apparatus according to a second embodiment in the present disclosure.
Figure 8:
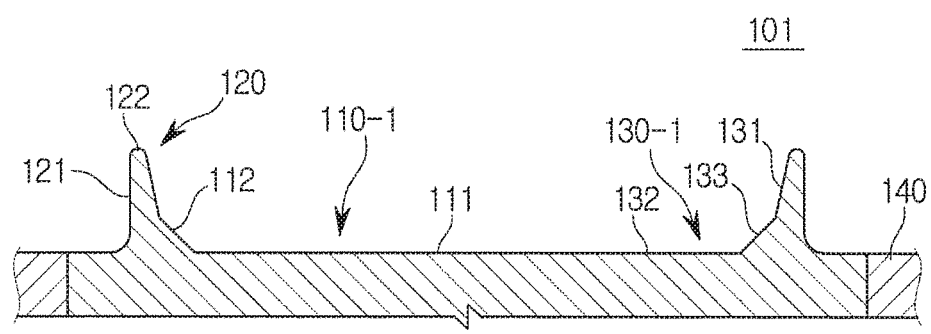
FIG. 8 is a cross-sectional view illustrating the touch input apparatus according to the second embodiment in the present disclosure.

FIG. 7 is a perspective view illustrating a touch input apparatus 101 according to a second embodiment in the present disclosure, and FIG. 8 is a cross-sectional view illustrating the touch input apparatus 101 according to the second embodiment.

A recessed portion 130-1 of the touch input apparatus 101 according to the second embodiment may include a connecting portion 133 which connects an inner side surface 131 and a bottom portion 132. The connecting portion 133 may have an inclined surface or a curved surface having a negative curvature. Here, the negative curvature is a curvature formed to be recessed when seen from an outside of the recessed portion 130-1.

The connecting portion 133 may be provided for a touch input. A user may input a touch signal by touching the connecting portion 133 or moving while touching the connecting portion 133.

The connecting portion 133 has an inclined surface or a curved surface having a negative curvature, and thus, the user may easily perform the touch input. The user may input a predetermined action command by touching or scrubbing an area in which the inner side surface 131 and the bottom portion 132 are connected to each other.

In addition, even when the user does not stare at the touch input apparatus 101 but looking straight ahead or a display, the user may intuitively recognize a position of the connecting portion 133. This is because not only the connecting portion 133 has the inclined shape or curved surface but also the inner side surface 131 is provided at an outside of the connecting portion 133. Accordingly, the user may input an intended action command even without looking at the connecting portion 133.

In the second embodiment, a touch portion 110-1 may include a central touch portion 111 provided on the bottom portion 132, and a peripheral touch portion 112 provided on the connecting portion 133. Touch pads provided at the central touch portion 111 and the peripheral touch portion 112 may be integrally formed, or may also be separately formed from each other.

A touch pad provided on the peripheral touch portion 112 may extend to the inner side surface 131. The user may touch not only the connecting portion 133 but also the inner side surface 131 to input a certain action command. Alternatively, the connecting portion 133 and the inner side surface 131 may receive different input signals. That is, when the user touches the connecting portion 133 and the inner side surface 131, different action commands may be input.

Figure 9:
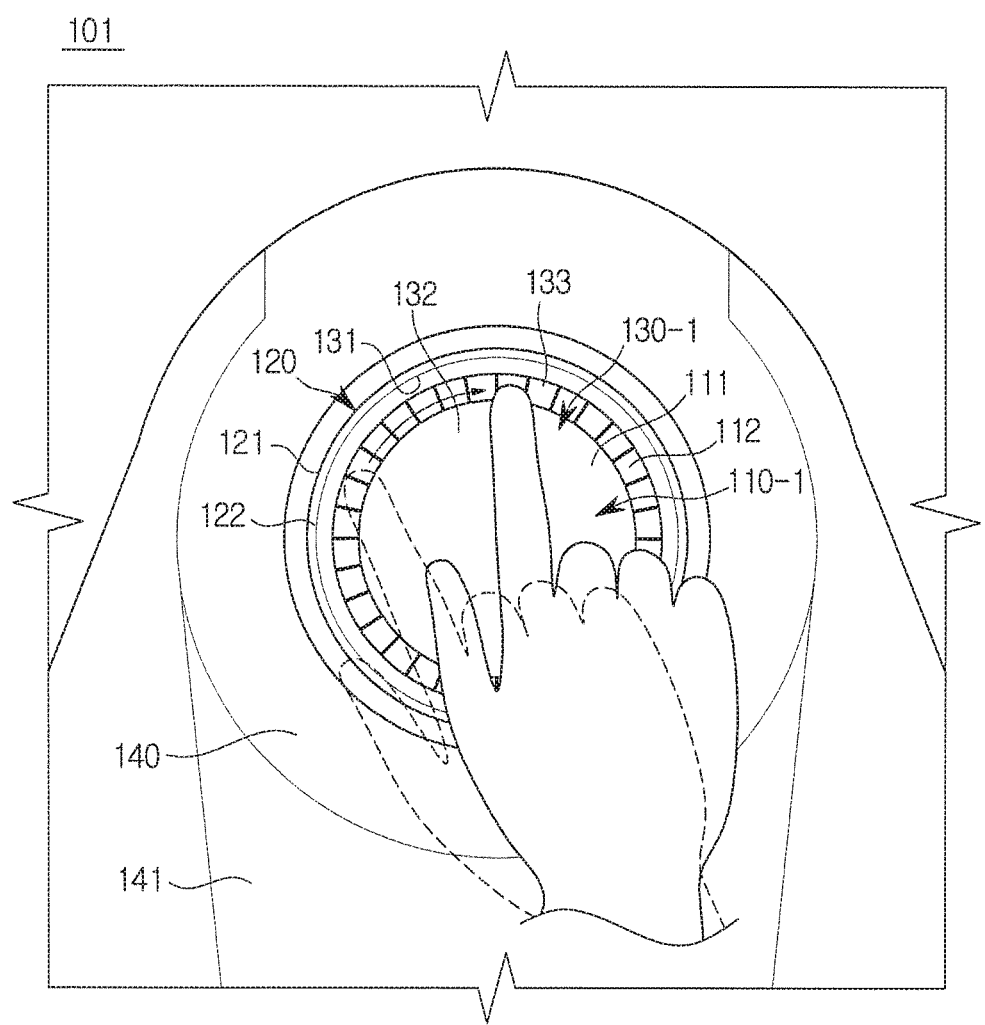
FIG. 9 is a plan view illustrating rolling input to describe a touch gesture of the touch input apparatus according to the second embodiment of the present disclosure.

FIG. 9 is a plan view illustrating rolling input to describe a touch gesture of the touch input apparatus according to the second embodiment.

Rolling is a touch input method of drawing a circular arc around the center of the touch portion 110-1, and circling or spin is a touch input method of drawing a circle around the center of the touch portion 110-1. Even though the rolling operation is illustrated in the drawings, the circling or spin operation may be included.

The user may touch the peripheral touch portion 112 to perform the rolling, or circling or spinning operation. For example, when the user touches the peripheral touch portion 112 to input a rolling touch, different commands may be performed according to a direction of the rolling, a position on which the rolling touch input is performed, or a length of a touch that the rolling touch input is performed.

As one example, when the pointer scrubs the peripheral touch portion 112 clockwise or counterclockwise, different touch inputs may be performed. In addition, when the pointer taps a left side or a right side of the peripheral touch portion 112, different touch inputs may be performed. In addition, when the pointer moves along the peripheral touch portion 112 while touching one point of the peripheral touch portion 112, different touch inputs may be performed according to positions on which the touch of the pointer is finished.

The connecting portion 133 (or the peripheral touch portion 112) may include graduations provided with predetermined gaps. The graduations may be formed in an embossed or intaglio manner. When a finger is used as the pointer and scrubs the connecting portion 133, the user may intuitively recognize how many graduations the user passes through a sensation felt by his or her finger even when the user does not look at the graduations. As one example, when the user inputs a rolling touch to the connecting portion 133 clockwise by five graduations, a cursor displayed on a display may move five steps right or clockwise.

The rolling and the circling or spin have been described above, but a tapping operation that the user touches one point of the peripheral touch portion 112 may also be received as a touch signal. In this case, different commands may be sent according to positions on which the user touches. As one example, when the user touches an upper side of the peripheral touch portion 112, a cursor of the display may move upward.

Figure 10:
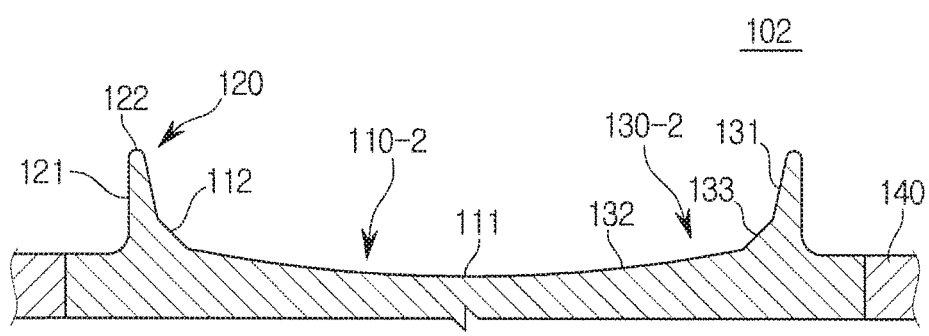
FIG. 10 is a cross-sectional view illustrating a touch input apparatus according to a third embodiment in the present disclosure.

FIG. 10 is a cross-sectional view illustrating a touch input apparatus 102 according to a third embodiment in the present disclosure.

A bottom portion 132 of a recessed portion 130-2 of the touch input apparatus 102 according to the third embodiment includes a recessed shape. Here, the recessed shape may be a reentrant or dented shape, and may include not only a shape recessed in a rounded manner but also an inclined or stepped shape.

As one example, the bottom portion 132 may include a recessed curved shape. Referring to FIG. 10, the bottom portion 132 has a recessed curved surface having a predetermined curvature. The bottom portion 132 may also have different curvatures. As one example, a curvature of a central portion may be smaller (that is, the radius of the curvature is great) than a curvature of a peripheral portion (that is, the radius of the curvature is small).

A touch portion 110-2 may be provided on the bottom portion 132. The touch portion 110-2 may include a recessed shape provided on the bottom portion 132. As one example, an area of the touch portion 110-2 may match a portion having a recessed shape and provided on the bottom portion 132.

Figure 11:
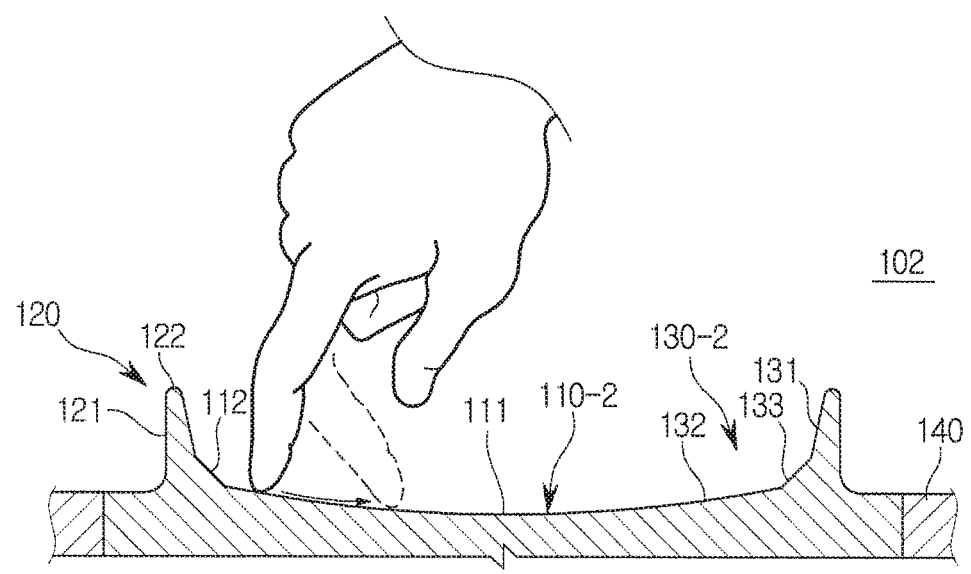
FIG. 11 is a view illustrating trace of a finger when a user inputs a gesture in an upward or down direction.
Figure 12:
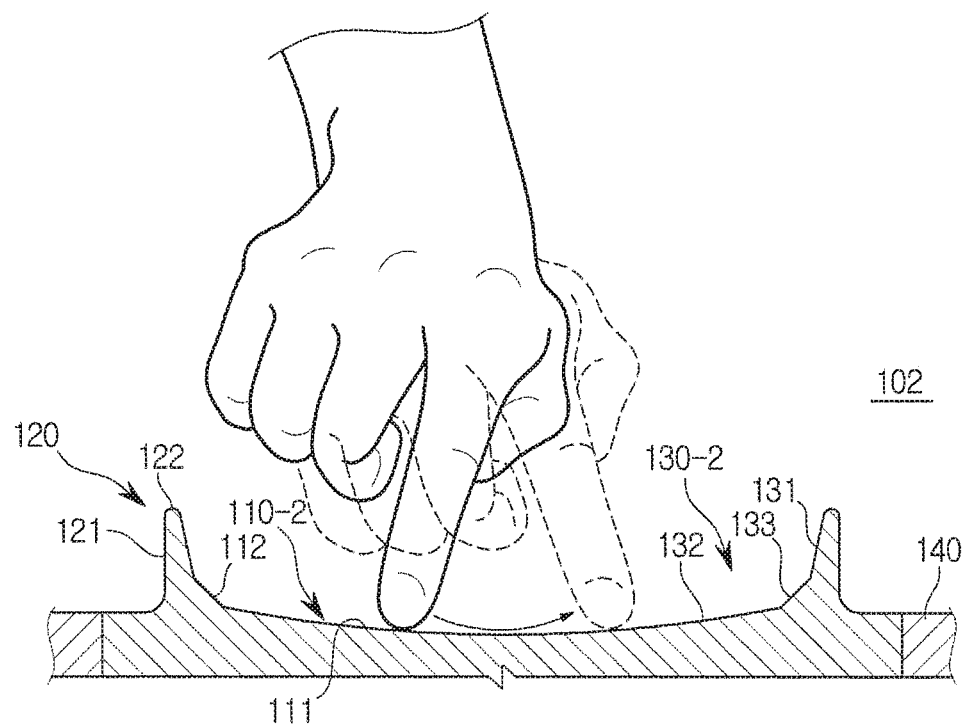
FIG. 12 is a view illustrating trace of a finger when a user laterally inputs a gesture.

FIG. 11 is a view illustrating trace of a finger when a user inputs a gesture in an upward or down direction, and FIG. 12 is a view illustrating trace of a finger when a user laterally inputs a gesture.

As the touch portion 110-2 has the recessed curved surface, touch sensation or operational sensation that a user feels when the user inputs a gesture may be improved. The curved surface of the touch portion 110-2 may be formed to be similar to a trace that movement of an end of his or her finger draws when the user perform an operation such as moving the finger while fixing his or her wrist, or rotating or twisting the wrist while straightening the finger.

The touch portion 110-2, which includes a recessed curved shape, may be ergonomically designed compared to a generally used flat touch portion 110-2. That is, not only operational sensation of the user may be improved but also fatigue applied to his or her wrist and the like may be decreased. In addition, the touch portion 110-2, which includes a recessed curved shape, may improve input accuracy of a gesture compared to input of the gesture to the flat touch portion 110-2.

Referring to FIG. 11, when the user moves his or her finger upward or downward, a gesture may be input by only natural movement of the finger in a state in which his or her joints except the finger do not move or are bent. Similarly, referring to FIG. 12, when the user laterally moves the finger, the user may input a gesture by natural movement of the finger and the wrist in a state in which the user does not excessively twist the wrist. As described above, since the shape of the touch portion 110-2 is ergonomically designed, fatigue that the user feels when using for a long time can be reduced, and skeletal diseases generated at the wrist or other joints may be prevented.

In addition, the touch portion 110-2 may have a circular shape. In this case, it is easy to form a recessed curved surface. In addition, as the touch portion 110-2 has the circular shape, since the user may recognize a touch area of the circular touch portion 110-2 using touch sensation, the user may easily input a rolling or circling operation, or the like.

In addition, since the touch portion 110-2 has a curved surface, the user may intuitively recognize at what position his or her finger is positioned on the touch portion 110-2. As the touch portion 110-2 is provided in the curved surface, a slope is different at any position of the touch portion 110-2. Accordingly, the user may intuitively recognize at what position his or her finger is positioned on the touch portion 110-2 through sensation of inclination that he or she feels through his or her finger.

When the user inputs a gesture to the touch portion 110-2 while not looking at the touch portion 110-2, since the above-described characteristic provides a feedback about at what position his or her finger is positioned on the touch portion 110-2, the above-described characteristic may help the user input a desired gesture, and the accuracy of gesture input may be improved.

The touch pad used for the touch portion 110-2 having a curved surface may recognize a touch using an optical manner. As one example, an infrared (IR) light emitting diode (LED) and a photodiode array may be disposed at a rear surface of the curved touch portion 110-2. The IR LED and photodiode gather images reflected by his or her finger, and a controller extracts a touch point from the gathered images.

A diameter and a depth of the touch portion 110-2 may be ergonomically designed. As one example, the diameter of the touch portion 110-2 may be determined in the range of 50 mm to 80 mm.

When an average length of fingers of adults is taken into consideration, a range in which a finger moves at once using only the finger in a state in which the wrist is fixed may be determined within 80 mm. When the diameter of the touch portion 110-2 is greater than 80 mm, and the user draws a circle on a swiping input portion 220, movement of the hand is unnatural, and the wrist is used more than necessity.

On the contrary, when the diameter of the touch portion 110-2 is less than 50 mm, since an area of a touch area decreases, diversity of gestures to be input may decrease. In addition, since a gesture is drawn in a narrow area, an error rate of gesture input increases.

In addition, when the touch portion 110-2 is provided in a spherical shape, a value that the depth of the touch portion 110-2 is divided by the diameter thereof may be determined in a range of 0.04 to 0.1. A value that the depth of the touch portion 110-2 is divided by the diameter thereof is the curvature of a curved surface of the touch portion 110-2. That is, in the touch portion 110-2 having the same diameter, as a value that a depth is divided by the diameter is greater, a more recessed shape is provided, on the contrary, as the value is smaller, a more flat shape is provided.

When a value that the depth of the touch portion 110-2 is divided by the diameter thereof is greater than 0.1, since the curvature of a recessed shape becomes great, the user's touch sensation is uncomfortable. The recessed shape of the touch portion 110-2 may match the curvature of a curved line that an end of his or her finger draws while the user moves the finger naturally. However, when a value that the depth thereof is divided by the diameter thereof is greater than 0.1, and the user moves the finger along the curved surface of the touch portion 110-2, since a force more than a necessity is applied on the finger, and an artificial operational sensation is felt. In addition, when the user unconsciously naturally moves the finger, the curved surface may be separated from the end of the finger. In this case, a touch of a gesture finishes, and thus, a recognition error occurs.

In addition, when a depth of the touch portion 110-2 is too low, it is difficult for the user to feel a merit that the curved surface portion has compared to a flat surface portion. When a value that the depth of the touch portion 110-2 is divided by the diameter thereof is less than 0.04, it is difficult for the user to feel a difference of operational sensation compared when the user draws a gesture on a flat touch portion 110-2.

In the third embodiment, the touch portion 110-2 may include a central touch portion 111 provided on the bottom portion 132, and a peripheral touch portion 112 provided on the connecting portion 133. Touch pads provided on the central touch portion 111 and the peripheral touch portion 112 may also be integrally formed, or may also be separately formed from each other. The peripheral touch portion 112 was described in detail in the second embodiment, and may be applied to the present embodiment as is.

The gradient of the connecting portion 133 may be provided greater than a gradient with respect to a direction of tangent of a curved surface of the bottom portion 132 at a border in which the connecting portion 133 and the bottom portion 132 are connected to each other. When the user inputs a gesture to a curved surface of the bottom portion 132, since the gradient of the connecting portion 133 is provided more steeply than the curved surface of the bottom portion 132, the user may intuitively feel a touch area of an inclined portion.

Meanwhile, a touch on a peripheral inclined portion may not be recognized while a gesture is input to the central touch portion 111. Accordingly, even when the finger reaches the border of the peripheral touch portion 112 while the user inputs a gesture to the central touch portion 111, gesture input to the central touch portion 111 and rolling operation input to the peripheral touch portion 112 may not be overlapped.

Figure 13:
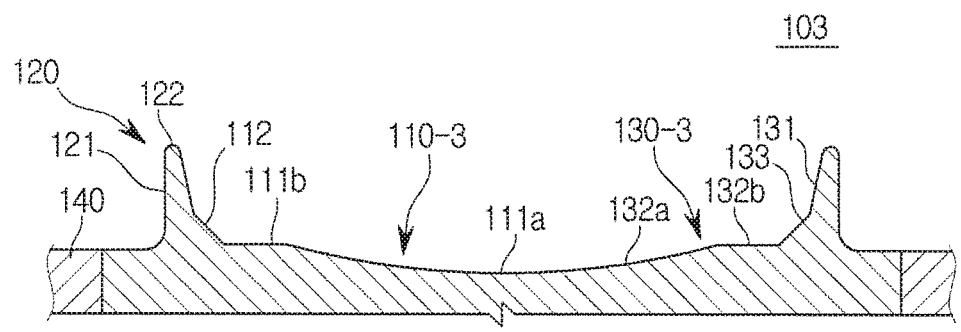
FIG. 13 is a cross-sectional view illustrating a touch input apparatus according to a fourth embodiment in the present disclosure.

FIG. 13 is a cross-sectional view illustrating a touch input apparatus according to a fourth embodiment in the present disclosure.

A touch portion 110-3 of a touch input apparatus 103 according to the fourth embodiment may include a first central touch portion 111a provided to have a recessed curved surface, a second central touch portion 111b which surrounds the first central touch portion 111a and is provided to have a flat surface, and a peripheral touch portion 112 which surrounds the second central touch portion 111b and is provided to have an inclined surface.

A bottom portion 132 may include a first bottom portion 132a positioned at a center thereof and having a recessed curved surface, and a second bottom portion 132b which surrounds the first bottom portion 132a and is provided to have a flat surface.

The first central touch portion 111a may be provided on the first bottom portion 132a, the second central touch portion 111b may be provided on the second bottom portion 132b, and the peripheral touch portion 112 may be provided on a connecting portion 133 of a recessed portion 130-3.

Each of the first central touch portion 111a, the second central touch portion 111b, and the peripheral touch portion 112 may independently receive a touch signal. As one example, the first central touch portion 111a may receive a gesture touch signal, the second central touch portion 111b may receive a direction touch signal, and the peripheral touch portion 112 may receive a rolling or circling touch signal.

Touch pads of the first central touch portion 111a, the second central touch portion 111b, and the peripheral touch portion 112 may be integrally provided, or may be separately provided from each other. When the touch pads are provided integrally, each of the touch pads may independently receive a touch signal by software.

Alternatively, the first central touch portion 111a, the second central touch portion 111b, and the peripheral touch portion 112 may combine touch signals each received by the touch portion 110-3, and perform a new command. As one example, when a user inputs a flicking or swiping gesture to the first central touch portion 111a, an icon may shift in a submenu, and when the user inputs a flicking or swiping gesture to the first central touch portion 111a while touching the second central touch portion 111b, an icon of a main menu may shift. Using such touch input, operation that moves from the submenu to the main menu and changes an icon of the main menu is simplified to directly change the icon of the main menu at the submenu. That is, a menu may directly move from a music play menu to a navigation menu.

Figure 14:
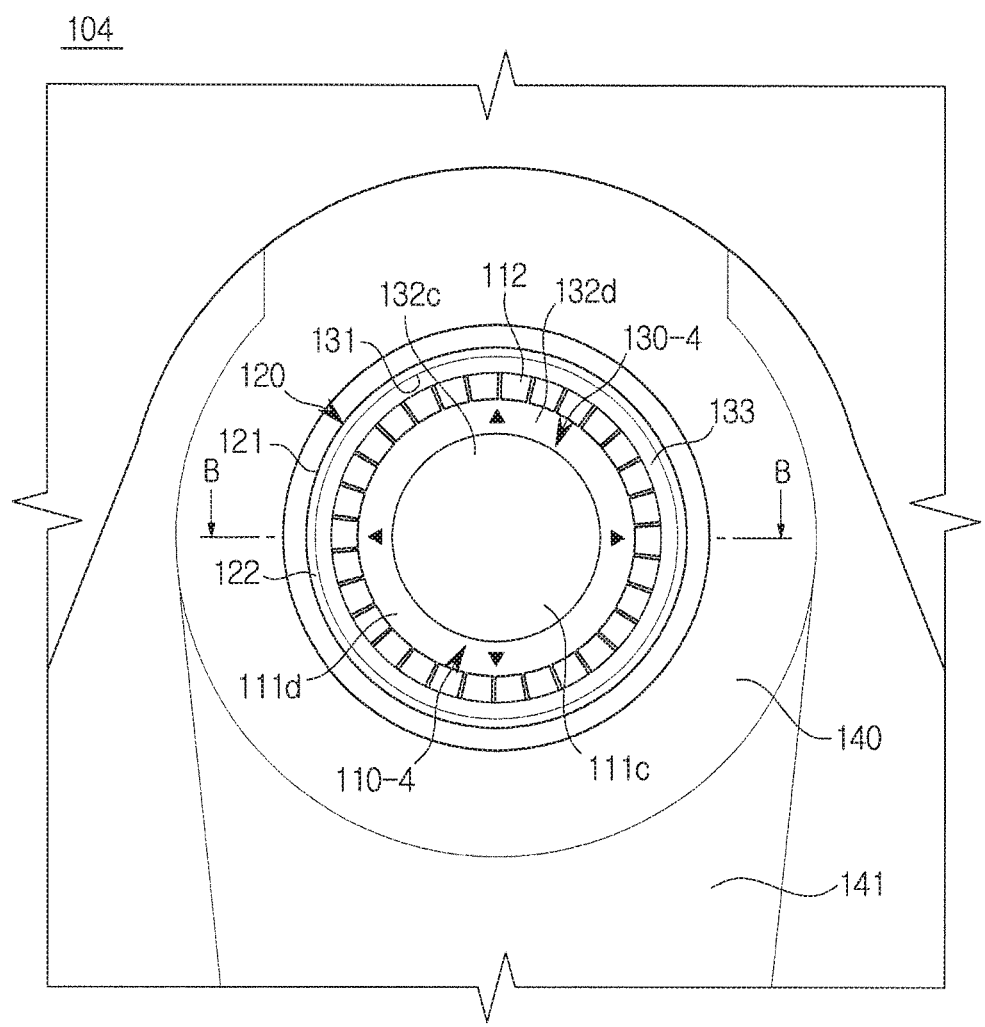
FIG. 14 is a plan view illustrating a touch input apparatus according to a fifth embodiment of the present disclosure
Figure 15:
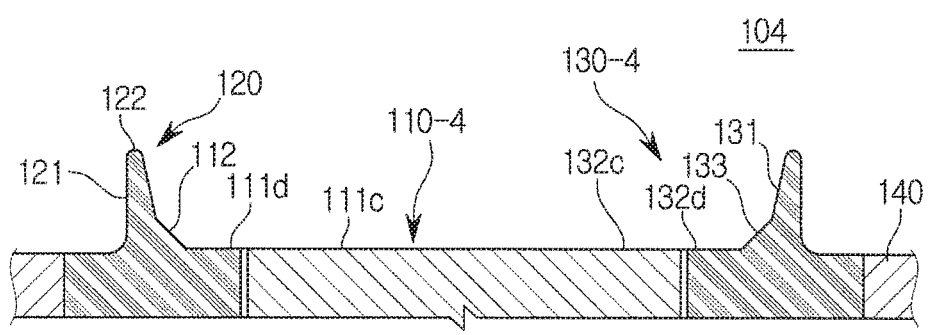
FIG. 15 is a cross-sectional view taken along line B-B of FIG. 14.

FIG. 14 is a plan view illustrating a touch input apparatus according to a fifth embodiment in the present disclosure, and FIG. 15 is a cross-sectional view taken along line B-B of FIG. 14.

A touch portion 110-4 of a touch input apparatus 104 according to the fifth embodiment may include a first central touch portion 111c, a second central touch portion 111d which surrounds the first central touch portion 111c, and a peripheral touch portion 112 which surrounds the second central touch portion 111d and is provided to have an inclined surface.

A bottom portion 132 may include a first bottom portion 132c positioned at a center thereof, and a second bottom portion 132d which surrounds the first bottom portion 132c. The first bottom portion 132c and the second bottom portion 132d may be separately provided from each other. Accordingly, the first bottom portion 132c may independently move with respect to the second bottom portion 132d. On the contrary, the second bottom portion 132d may also independently move with respect to the first bottom portion 132c.

The first central touch portion 111c may be provided on the first bottom portion 132c, the second central touch portion 111d may be provided on the second bottom portion 132d, and the peripheral touch portion 112 may be provided on a connecting portion 133 of a recessed portion 130-4.

The first central touch portion 111c and the second central touch portion 111d may be separately provided physically. Accordingly, each of a touch pad of the first central touch portion 111c and a touch pad of the second central touch portion 111d are independently provided.

Each of the first central touch portion 111c and the second central touch portion 111d may independently move. As one example, the first central touch portion 111c may adopt a pushable structure, and the second central touch portion 111d may adopt a tiltable structure in four directions including upper, lower, left, and right directions. In this case, a user may move a cursor of a display by pressing to tilt the second central touch portion 111d. In addition, the user may select a menu where a cursor of the display is positioned by pressing to click the first central touch portion 111c.

In addition, the first central touch portion 111c and the second central touch portion 111d may move differently. As one example, the first central touch portion 111c may adopt a tiltable structure, and the second central touch portion 111d may adopt a pushable structure.

Alternatively, neither the first central touch portion 111c nor the second central touch portion 111d may adopt moving structures. In this case, the first central touch portion 111c and the second central touch portion 111*d* are physically separated, and respectively include different touch pads.

Each of the first central touch portion 111*c* and the second central touch portion 111*d*, and the peripheral touch portion 112 may independently receive a touch signal. As one example, the first central touch portion 111*c* may receive a gesture touch signal, the second central touch portion 111*d* may receive a direction touch signal, and the peripheral touch portion 112 may receive a rolling or circling touch signal.

Figure 16:
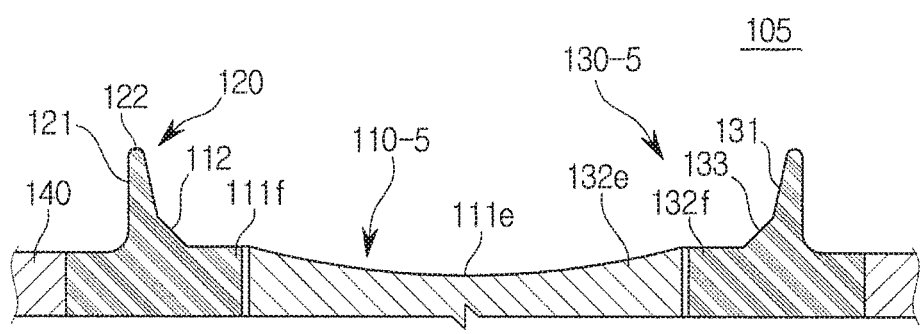
FIG. 16 is a cross-sectional view illustrating a touch input apparatus according to a sixth embodiment in the present disclosure.

FIG. 16 is a cross-sectional view illustrating a touch input apparatus 105 according to a sixth embodiment in the present disclosure.

A touch portion 110-5 of a touch input apparatus 105 according to the sixth embodiment may include; a first central touch portion 111*e* having a recessed curved surface; a second central touch portion 111*f* surrounding the first central touch portion 111*e* and having a flat surface; and a peripheral touch portion 112 surrounding the second central touch portion 111*f* and having an inclined surface.

A bottom portion 132 may include a first bottom portion 132*e* positioned at a center thereof and having a recessed curved surface, and a second bottom portion 132*f* surrounding the first bottom portion 132*e* and having a flat surface.

The first central touch portion 111*e* may be provided on the first bottom portion 132*e*, the second central touch portion 111*f* may be provided on the second bottom portion 132*f*, and the peripheral touch portion 112 may be provided on a connecting portion 133 of a recessed portion 130-5.

The first central touch portion 111*e* and the second central touch portion 111*f* may be separately provided. Accordingly, each of a touch pad of the first central touch portion 111*e* and a touch pad of the second central touch portion 111*f* are provided independently.

Figure 17:
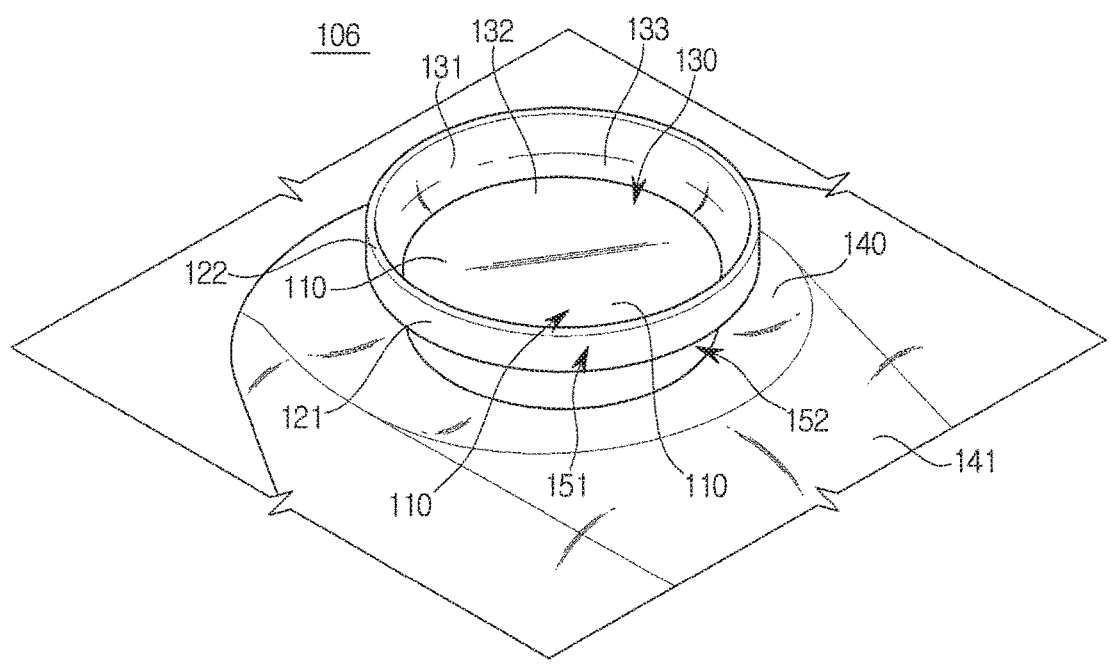
FIG. 17 is a perspective view illustrating a touch input apparatus according to a seventh embodiment in the present disclosure.
Figure 18:
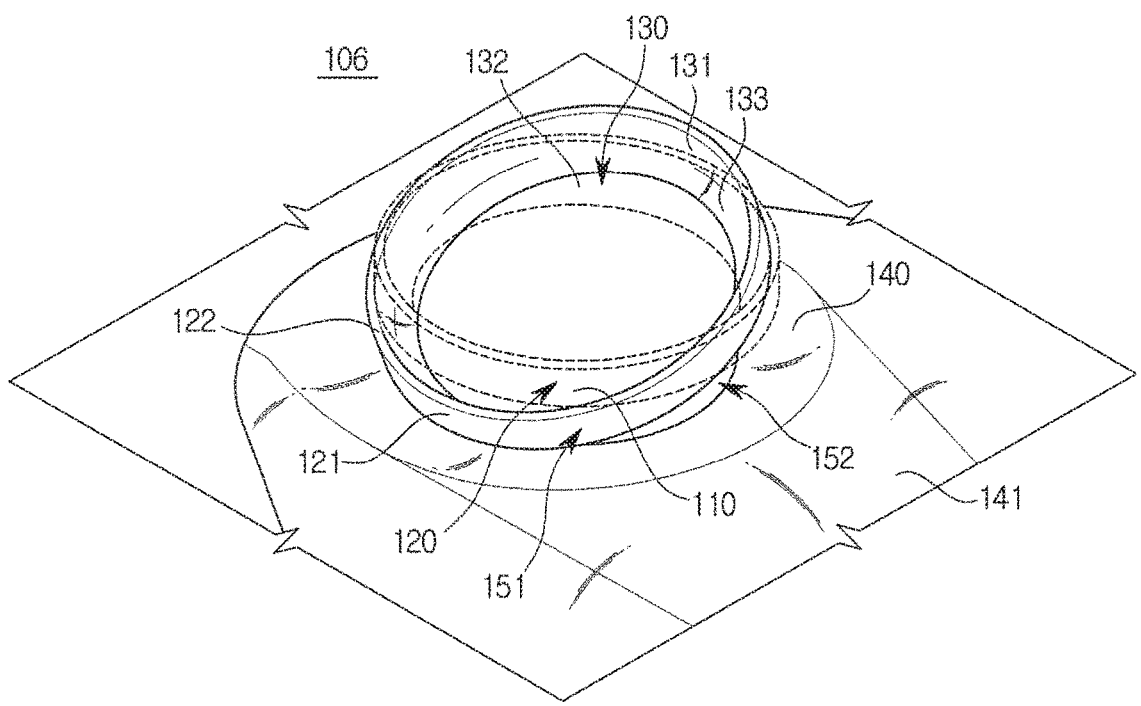
FIG. 18 is a perspective view when the touch input apparatus according to the seventh embodiment is operated.

FIG. 17 is a perspective view illustrating a touch input apparatus 106 according to a seventh embodiment in the present disclosure, and FIG. 18 is a perspective view when the touch input apparatus 106 according to the seventh embodiment is operated.

The touch input apparatus 106 according to the seventh embodiment may be inclinable or tiltable. The touch input apparatus 106 may form a structure including a protrusion 120 and a recessed portion 130, and may be tiltable with respect to a mounting surface 140. In addition, the touch input apparatus 106 may be provided for a push operation.

The touch input apparatus 106 may include a body 151 including the protrusion 120 and the recessed portion 130, and a support portion 152 which supports the body 151. The support portion 152 may support a lower portion of the body 151, and may be inclined with respect to the mounting surface 140. However, since inclinable structures are not difficult to implement using known technologies, the detailed illustration and description will be omitted.

The touch input apparatus 106 may be inclined in at least one direction with respect to a central axis. As one example, the touch input apparatus 106 may be inclined in front, rear, left, and right directions. In addition, the touch input apparatus 106 may also be provided to be inclined in further various directions. In addition, when a central portion of the touch input apparatus 106 is pushed, a touch portion 110 may be pushed in a parallel state.

The user may input a certain action signal by pressing to push or incline the touch input apparatus 106. As one example, the user may execute a selected menu and the like by pushing the central portion of the touch input apparatus 106, and the user may move a cursor to an upper portion by pushing the upper portion of the touch input apparatus 106.

Even though it is not illustrated in the drawings, the touch input apparatus 106 may embed various components related to an operation. A structure configured to be pushable or inclinable in the above-described five directions may be included in the touch input apparatus 106. However, since such structures can be implemented using known technologies, the detailed description thereof will be omitted.

Figure 19:
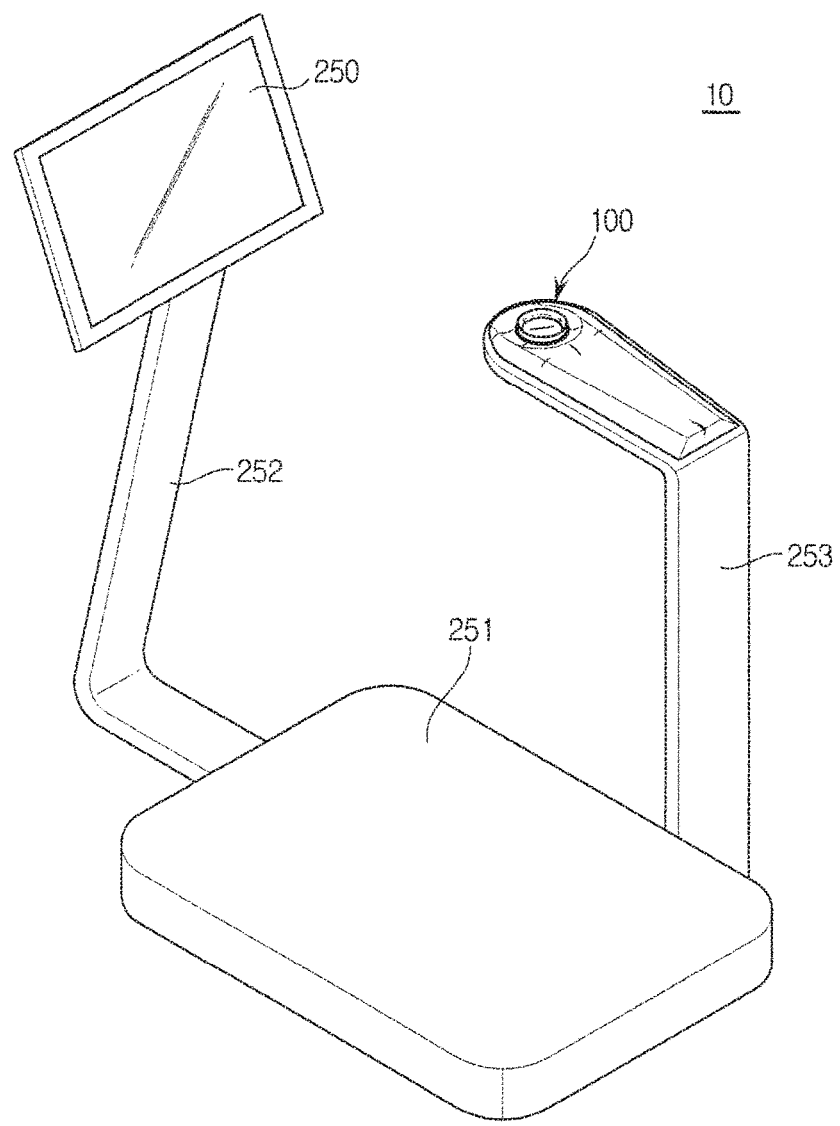
FIG. 19 is a perspective view when the touch input apparatus according to the first embodiment is installed in a health care device.

FIG. 19 is a perspective view when the touch input apparatus according to the first embodiment is installed in a health care device.

The touch input apparatus 100 according to the first embodiment may be installed at a health care device 10. Here, the health care device 10 may include a medical instrument. The health care device 10 may include a body 251 on which a user stands, a display 250, a first connecting portion 252 which connects the body 251 and the display 250, the touch input apparatus 100, and a second connecting portion 253 which connects the touch input apparatus 100 and the body 251.

The body 251 may measure various user information including a weight. In addition, the display 250 may display information of various images including the measured body information. In addition, the user may operate the touch input apparatus 100 while looking at the display 250.

Figure 20:
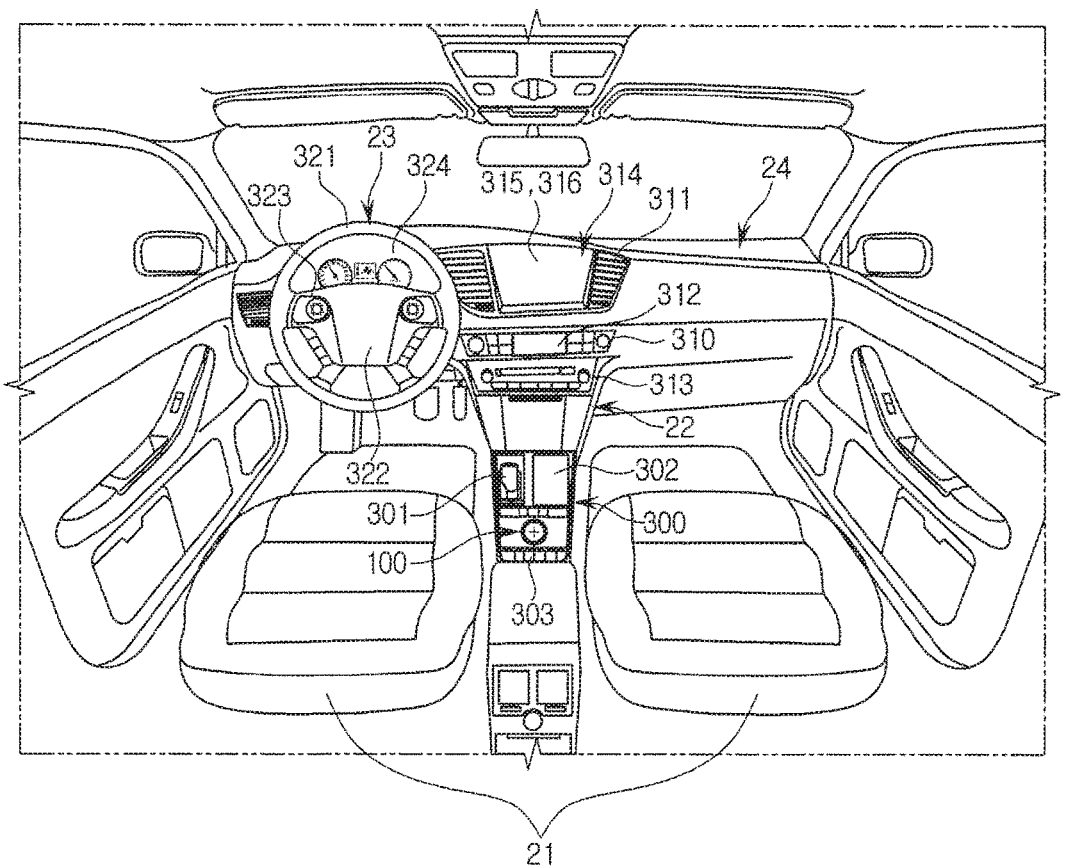
FIG. 20 is a view illustrating an indoor feature of a vehicle in which the touch input apparatus according to the first embodiment is installed.

FIG. 20 is a view illustrating an indoor feature of a vehicle in which the touch input apparatus according to the first embodiment is installed.

The touch input apparatus 100 according to the first embodiment may be installed in a vehicle 20.

Here, the vehicle 20 moves an object, such as a human, an object, or an animal, from a point of departure to a destination. The vehicle 20 may include a car which travels on a road or a railroad, a ship which moves on sea or river, and a plane which flies in the air using an air effect.

In addition, the car which travels on a road or a railroad may move in a predetermined direction according to rotation of at least one wheel. For example, the car may include a three wheel or four wheel car, construction equipment, a two wheel car, a motor bicycle, a bicycle, and a train which travels on a railroad.

Referring to FIG. 20, the vehicle 20 may include a seat 21 on which a driver or passenger sits, and a dashboard 24 including a gear box 300, a center fascia 22, and a steering wheel 23.

An air conditioner 310, a watch 312, an audio system 313, and an audio, visual navigation (AVN) system 314 and the like may be installed in the center fascia 22.

The air conditioner 310 adjusts temperature, humidity, cleanliness of air, and air flow in the vehicle 20 to maintain an inside of the vehicle 20 comfortable. The air conditioner 310 is installed in the center fascia 22 and includes at least one discharging port 311 which discharges air. A button or a dial for controlling the air conditioner 310 may be mounted on the center fascia 22. A user such as a driver may control the air conditioner 310 using the button disposed on the center fascia 22.

The watch 312 may be disposed around the button or dial for controlling the air conditioner 310.

The audio system 313 includes an operation panel on which a plurality of buttons for performing a function of the audio system 313 are provided. The audio system may provide a radio mode which provides a radio function, and a media mode which reproduces an audio file included in various storage media which stores audio files.

The AVN system 314 may be embedded in the center fascia 22 of the vehicle 20, or protrude from the dashboard 24. The AVN system 314 is an apparatus capable of integrally performing an audio function, a video function, and a navigation function according to the user's operation. The AVN system 314 may include an input portion 315 which receives user commands for the AVN system 314, and a display 316 which displays a screen related to the audio function, the video function, or the navigation function. The audio system 313 may also be omitted when overlapped with the AVN system 314.

The steering wheel 23 may be an apparatus for adjusting a driving direction of the vehicle 20, may include a rim 321 which is gripped by the driver, and a spoke 322 which is connected to a steering system of the vehicle 20 and connects the rim 321 and a hub of a rotation shaft for steering. An operation apparatus 323 for controlling various apparatuses, for example, an audio system and the like, of the vehicle 20 may be formed in the spoke 322.

In addition, the dashboard 24 may include an instrument panel 324 which shows various car information such as vehicle speed, travel distance, engine revolutions per minute (RPM), amount of gas, temperature of cooling water, and various warnings, to a driver while driving, and a globe box 325 which stores various objects.

The gear box 300 may be generally installed between a driver's seat and a passenger seat in the vehicle 20, and operation apparatuses need to be operated while the driver is driving the vehicle 20 may be installed in the gear box 300.

Figure 21:
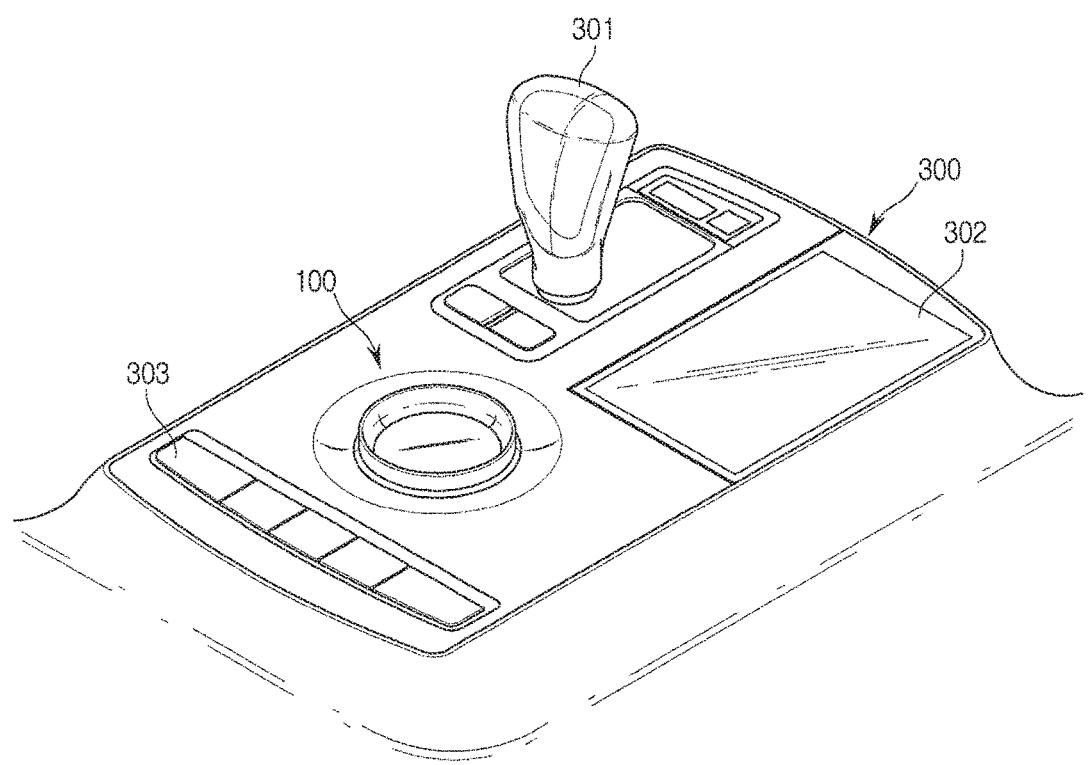
FIG. 21 is a perspective view illustrating a gear box in which the touch input apparatus according to the first embodiment is installed.

FIG. 21 is a perspective view illustrating a gear box in which the touch input apparatus according to the first embodiment is installed.

Referring to FIG. 21, a change lever 301 for changing speed of the vehicle 20, a display 302 for controlling a performance of a function of the vehicle 20, and a button 303 for executing various apparatuses of the vehicle 20 may be installed in the gear box 300. In addition, the touch input apparatus 100 according to the second embodiment may be installed in the gear box 300.

The touch input apparatus 100 may be installed in the gear box 300 and may be positioned to be operated in a state in which the driver keeps eyes on the front while driving. As one example, the touch input apparatus 100 may be positioned under the change lever 301. The touch input apparatus 100 may also be installed at the center fascia 22, the passenger seat, or a rear seat.

The touch input apparatus 100 may be connected to displays in the vehicle 20, and may select or execute various icons displayed on the displays. The displays installed in the vehicle 20 may include the audio system 313, the AVN system 314, or the instrument panel 324. In addition, when necessary, the display 302 may be installed in the gear box 300. In addition, the display may also be connected to a head up display (HUD), a rearview mirror, or the like.

As one example, the touch input apparatus 100 may move a cursor displayed on the display, or execute an icon. The icon may include a main menu, an option menu, a setting menu, and the like. In addition, a navigation may be operated, a driving condition of the vehicle may be set, or peripheral apparatuses of the vehicle may be executed using the touch input apparatus 100.

As is apparent from the above description, in accordance with the embodiments in the present disclosure, a user can intuitively recognize a touch area in a state in which the user does not stare at a touch portion, that is, the user looks at a display or looks straight ahead, by forming a protrusion which surrounds the touch portion to be higher than a mounting surface therearound. Thus, the user can quickly and safely input a touch, and a recognition rate of a gesture touch signal can be improved.

Particularly, when a touch input apparatus according to the various embodiments in the present disclosure is applied to a vehicle, a driver can input a correct gesture while keeping his or her eyes on the front when driving and operating a navigation or an audio system.

Since a user can intuitively recognize at what position his or her finger is positioned on a touch input portion through sensation of inclination that the user can feel through the finger even without looking at the touch input portion by the touch portion including a recessed curved shape, the user can input an intended touch gesture.

In addition, when a user inputs a touch gesture, the operational sensation and the touch sensation can be improved by the touch portion including a recessed curved shape. In addition, as a shape of the touch portion is ergonomically designed, even when a user uses the touch input apparatus for a long time, the touch portion does not stress his or her joints such as his or her wrist or hand.

A swiping input portion can be provided around a gesture input portion to dial manually. In addition, since the swiping input portion can recognize various touch gestures, the swiping input portion can perform more various and improved functions than that of the dial.

In addition, a user can intuitively recognize a swiping angle (or distance) by graduations that the user can feel through his or her finger being marked on the swiping input portion. Accordingly, operational freedom can be further improved and input accuracy can be improved by different signals being input according to the swiping angle or distance.

A user can further intuitively distinguish a gesture input portion and a swiping input portion by a touch by differentiating an inclination angle of the gesture input portion from that of the swiping input portion.

Furthermore, a command can be quickly performed by providing the touch input portion to be pushed in various directions and performing different functions according to a direction toward which the touch input portion is pushed.

While the invention has been described with reference to exemplary embodiments illustrated in the accompanying drawings, these should be considered in a descriptive sense only, and it will be understood by those skilled in the art that various alterations and equivalent other embodiment may be made. Therefore, the scope of the invention is defined by the appended claims.

What is claimed is:

1. A touch input apparatus mounted on a mounting surface, comprising:
   a protrusion protruding from the mounting surface;
   a recessed portion in the protrusion;
   a connecting portion connecting an inner side surface of the protrusion and a bottom surface of the recessed portion; and
   a touch portion disposed on the bottom surface of the recessed portion and receiving a user's touch signal,
   wherein the recessed portion and the touch portion are located at a lower or equal height than the mounting surface,
   the touch portion includes a central touch portion on the bottom surface of the recessed portion and a peripheral touch portion on the connecting portion, and
   the peripheral touch portion is inclined toward the central touch portion.

2. The touch input apparatus of claim 1, wherein the protrusion is integrally formed with the mounting surface.

3. The touch input apparatus of claim 1, wherein the protrusion includes a cross-section having a circular shape, and
wherein the recessed portion is recessed in a circular shape from a ridge portion of the protrusion.

4. The touch input apparatus of claim 1,
wherein the connecting portion has an inclined surface or curved surface which has a negative curvature.

5. The touch input apparatus of claim 1, wherein the touch portion receives different touch signals at an upper portion, a lower portion, a left portion, a right portion, and a central portion thereof.

6. The touch input apparatus of claim 1, wherein the touch portion has a recessed curved shape.

7. The touch input apparatus of claim 6,
wherein the connecting portion has an inclined surface or a curved surface which has a negative curvature, and
wherein the connecting portion receives a rolling gesture.

8. The touch input apparatus of claim 1,
wherein the bottom surface independently moves with respect to the inner side surface.

9. The touch input apparatus of claim 8, wherein the bottom surface tilts in upper, lower, left, and right directions.

10. The touch input apparatus of claim 8, wherein the connecting portion has an inclined surface or a curved surface which has a negative curvature, and
wherein the connecting portion receives a rolling gesture.

11. The touch input apparatus of claim 4, wherein the connecting portion receives a rolling gesture.

12. The touch input apparatus of claim 11, wherein the connecting portion includes a plurality of graduations in an embossed or intaglio manner.

13. The touch input apparatus of claim 1, wherein the touch portion includes:
a central touch portion positioned in a center thereof,
wherein the peripheral touch portion surrounds the central touch portion, and
wherein the central touch portion and the peripheral touch portion independently receives the user's touch signal.

14. The touch input apparatus of claim 13, wherein the central touch portion includes a recessed curved shape.

15. The touch input apparatus of claim 13, wherein the bottom surface includes:
a first bottom surface on which the central touch portion is disposed; and
a second bottom surface on which the peripheral touch portion is disposed, and
the first bottom surface and the second bottom surface relatively move from each other.

16. The touch input apparatus of claim 15, wherein the first bottom surface tilts.

17. The touch input apparatus of claim 1, wherein the protrusion, the recessed portion, and the touch portion are integrally formed into one structure, and
wherein the one structure tilts with respect to the mounting surface.

18. A touch input apparatus mounted on a mounting surface, comprising:
a protrusion protruding from the mounting surface and having a cylinder shape;
a recessed portion in the protrusion and having a central portion, the recessed portion including an inner side surface which is connected downward from a ridge portion of the protrusion and a bottom portion connected to the inner side surface;
a connecting portion connecting the inner side surface and the bottom portion; and
a touch portion on the bottom portion of the recessed portion and receiving a user's touch signal,
wherein the recessed portion and the touch portion are located at a lower or equal height than the mounting surface,
the touch portion includes a central touch portion on the central portion and a peripheral touch portion on the connecting portion, and
the peripheral touch portion is inclined toward the central touch portion.

19. A vehicle comprising a touch input apparatus mounted on a mounting surface, the touch input apparatus comprising:
a protrusion protruding from the mounting surface;
a recessed portion in the protrusion; and
a connecting portion connecting an inner side surface of the protrusion and a bottom surface of the recessed portion; and
a touch portion disposed on the bottom surface of the recessed portion and receiving a user's input, wherein the vehicle includes:
a display; and
a controller configured to operate the display according to the user's input which is inputted to the touch input apparatus,
wherein the recessed portion and the touch portion are located at a lower or equal height than the mounting surface,
the touch portion includes a central touch portion on the bottom surface of the recessed portion and a peripheral touch portion on the connecting portion, and
the peripheral touch portion is inclined toward the central touch portion.

20. The vehicle of claim 19, wherein the controller converts the user's input to the touch input apparatus into an input signal and sends an operational signal so that the display displays an operation according to the input signal, and wherein the user's input includes a gesture input.

* * * * *